Patented May 31, 1938

2,118,918

UNITED STATES PATENT OFFICE 2,118,918

PURIFICATION OF PHTHALIC ANHYDRIDE

Harold B. Foster, Williamsville, and Elton B. Punnett, Buffalo, N. Y., assignors to National Aniline & Chemical Company, Inc., New York, N. Y., a corporation of New York No Drawing. Application February 9, 1935, Serial No. 5,842

17 Claims. (Cl. 260—123)

This invention relates to an improvement in the purification of phthalic anhydride.

In the production of phthalic anhydride by subjecting naphthalene in the vapor phase to partial or selective oxidation by means of oxygen or oxygen-containing gases in the presence of a catalyzer and at an elevated temperature, it is well known that the phthalic anhydride recovered from the mixed reaction products is contaminated with impurities. The removal of such impurities may be accomplished by subjecting the impure phthalic anhydride to treatment with an agent which is capable of forming decomposition, oxidation or condensation products with the impurities, and subliming or distilling. Sulfuric anhydride substances, as for example, sulfuric acid and oleum, are especially effective agents for this purpose. As a result of the treatment with such agents, very small amounts of sulfuric anhydride substances may be carried over with the phthalic anhydride vapors into the sublimed or distilled phthalic anhydride and be present as impurities therein. While the presence of such small amounts of such sulfuric anhydride impurities in distilled or sublimed phthalic anhydride ordinarily is not harmful and may be beneficial for certain industrial uses, the presence of even such small amounts of such acidic impurities is objectionable in connection with certain other industrial uses, as for example, the manufacture of certain resins.

It is accordingly the principal object of the present invention to provide a method for removing such sulfuric anhydride impurities from phthalic anhydride containing them.

It has now been found that phthalic anhydride may be freed from said sulfuric anhydride impurities by treating the phthalic anhydride, in the liquid state, and at a suitable temperature, with substances, preferably in a finely divided state, which are capable of effecting substantially complete decomposition of the sulfuric anhydride impurities to form decomposition products (gaseous and/or non-volatile) that are easily separable from phthalic anhydride. Phthalic anhydride may then be recovered in a purified form, for example, by distillation or sublimation. The substances or purifying agents especially employed in accordance with the present invention comprise the elements which react with sulfuric acid with formation of sulfur dioxide. Preferably they are relatively non-volatile (with respect to the phthalic anhydride) and undergo no appreciable reaction with the phthalic anhydride at the temperatures employed. Particularly advantageous as purifying agents are carbon and those metals and metalloids having the properties enumerated above and standing below hydrogen in the electromotive series, and specifically copper, arsenic, antimony and bismuth.

In the practice of the present invention, phthalic anhydride contaminated with sulfuric anhydride impurities is heated at a temperature above the melting point of the phthalic anhydride in the presence of an element of the type referred to, and preferably carbon or copper, whereby said impurities are decomposed to form gaseous products (such as, for example, sulfur dioxide, oxides of carbon, steam, etc.) and/or inert relatively non-volatile products. While the invention is not limited to any theoretical explanation, it appears that the treatment effects a reduction of the sulfuric anhydride impurities. In carrying out the process in accordance with a preferred method of procedure a mixture of impure phthalic anhydride and purifying agent is boiled preferably at a temperature within the range of about 250° C. to about 290° C. and at a corresponding pressure. The gaseous decomposition products are separated from the vapors of the phthalic anhydride by physical means, for example, by condensing the vapors of phthalic anhydride in a suitably cooled reflux condenser which returns the condensed phthalic anhydride to the reaction vessel while allowing the gases produced by the decomposition of the sulfuric anhydride impurities to escape therefrom through a suitable vent. In order to insure complete removal of the sulfuric anhydride impurities, it is preferred to boil and reflux the phthalic anhydride for a period of time after no further gaseous decomposition products are in evidence in the vapors, as determined by analysis of the gases issuing from the vent. Finally the purified phthalic anhydride is vaporized, e. g. distilled at atmospheric pressure or sub-atmospheric pressure, the latter preferably being employed, and the purified phthalic anhydride collected.

In carrying out the procedure of the invention, the phthalic anhydride may be reduced to the molten state prior to the addition of the purifying agent, or the purifying agent may be added to the phthalic anhydride and the mixture then melted. It is desirable, however, that the purifying agent be in a finely divided condition in order to insure its quick and uniform distribution or suspension throughout the molten phthalic anhydride. The amount of purifying agent which may be employed may vary considerably, since any excess above that required to react with the sulfuric anhydride impurities does not volatilize or react with the phthalic anhydride under the conditions of treatment and, therefore, remains behind as an inert residue when the purified phthalic anhydride is separated from the decomposition products by vaporization, e. g. by distillation. It is preferred, however, to limit the maximum amount of purifying agent to about 2 per cent of the weight of the phthalic anhydride to be treated, since such a quantity has been found to be adequate, in most instances, to remove all the impurities effectively without undue waste.

The following example, in which the parts are by weight, is given to illustrate the invention:

*Example.*—100 parts of phthalic anhydride which has been heated with oleum and distilled, and which contains a small amount of sulfuric anhydride impurities, are added to a still which is fitted with a reflux condenser and means for heating and agitating the phthalic anhydride and which is adapted for conducting all or any of these operations under either atmospheric or other pressures. One part of finely divided, calcined wood-charcoal is added to the charge and the resulting mixture is heated under atmospheric pressure with constant stirring until it boils gently. The temperature of the reflux condenser is controlled so that vapors of phthalic anhydride are condensed and returned to the still while the gaseous decomposition products (e. g., sulfur dioxide, etc.) formed by interaction of the charcoal with the sulfuric anhydride impurities are not condensed but are removed through a vent situated at the top of the reflux column. Gas samples are taken from the vent and analyzed for said gaseous decomposition products. When the analyses indicate completion of the reaction, i. e., when no more gaseous decomposition products are evolved, the mass is further boiled and refluxed for about 1 hour and then distilled in vacuo in the usual manner. The purified and distilled phthalic anhydride resulting from this process is quite suitable for making resins and for other industrial uses.

It will be understood that the invention is not limited to the example as given, but that changes may be made without departing from the scope of the invention. For example, instead of using carbon or copper, as indicated above, finely divided antimony, arsenic or bismuth may be used. Further, sub-atmospheric or super-atmospheric pressures may be used in place of atmospheric pressure; but atmospheric and sub-atmospheric pressures are preferred. Also, although the use of temperatures between about 250° C. to about 290° C. are preferred, other temperatures may be used if desired.

Furthermore, in place of carbon in the form of calcined wood-charcoal, it is also possible to use other forms of carbon, such as for example, sugar charcoal, gas black, blood charcoal, animal charcoal, lamp black, powdered coal, coke, graphite or the like.

We claim:

1. A process for the purification of phthalic anhydride obtained by subjecting impure phthalic anhydride to a purifying treatment with a sulphuric anhydride purifying agent and containing sulfuric anhydride impurities which comprises subjecting said phthalic anhydride to the action under reaction conditions of a substance that reacts with sulfuric acid with formation of sulfur dioxide for a period of time at least sufficient to decompose said sulfuric anhydride impurities.

2. A process for the purification of phthalic anhydride obtained by subjecting impure phthalic anhydride to a purifying treatment with a sulfuric anhydride purifying agent and containing sulfuric acid impurities which comprises bringing said phthalic anhydride into contact with a relatively non-volatile element that reacts with sulfuric acid with formation of sulfur dioxide, reacting said element with said impurities, and separating the purified phthalic anhydride from the resulting decomposition products.

3. A process for the purification of phthalic anhydride obtained by subjecting impure phthalic anhydride to a purifying treatment with a sulfuric anhydride purifying agent and containing sulfuric anhydride impurities which comprises heating said phthalic anhydride with an element that reacts with sulfuric acid with formation of sulfur dioxide and without affecting said phthalic anhydride at a reaction temperature, continuing the heating until the sulfuric anhydride impurities are decomposed, and recovering purified phthalic anhydride.

4. A process for the purification of phthalic anhydride obtained by subjecting impure phthalic anhydride to a purifying treatment with a sulfuric anhydride purifying agent and containing sulfuric anhydride impurities which comprises boiling said phthalic anhydride at a temperature of about 250° C. to about 290° C. in intimate contact with an element that reacts with sulfuric acid with formation of sulfur dioxide and without affecting said phthalic anhydride for a period of time at least sufficient to decompose said sulfuric anhydride impurities, and recovering purified phthalic anhydride.

5. A process for the purification of phthalic anhydride obtained by subjecting impure phthalic anhydride to a purifying treatment with a sulfuric anhydride purifying agent and containing sulfuric anhydride impurities which comprises intimately contacting said phthalic anhydride at a temperature above its melting point with a metal standing between hydrogen and mercury in the electromotive series for a period of time at least sufficient to decompose said sulfuric anhydride impurities.

6. A process for the purification of phthalic anhydride obtained by subjecting impure phthalic anhydride to a purifying treatment with a sulfuric anhydride purifying agent and containing sulfuric anhydride impurities which comprises intimately contacting said phthalic anhydride at a temperature above its melting point with not more than about 2 per cent by weight of a metal standing between hydrogen and mercury in the electromotive series for a period of time at least sufficient to decompose said sulfuric anhydride impurities, and recovering purified phthalic anhydride.

7. A process for the purification of phthalic anhydride obtained by subjecting impure phthalic anhydride to a purifying treatment with a sulfuric anhydride purifying agent and containing sulfuric anhydride impurities which comprises refluxing said phthalic anhydride in intimate contact with a metal standing between hydrogen and mercury in the electromotive series for a period of time at least sufficient to decompose said sulfuric anhydride impurities, and separating and recovering purified phthalic anhydride.

8. A process for the purification of phthalic anhydride obtained by subjecting impure phthalic anhydride to a purifying treatment with a sulfuric anhydride purifying agent and containing sulfuric anhydride impurities which comprises intimately contacting said phthalic anhydride at a temperature above its melting point with finely divided carbon for a period of time at least sufficient to decompose said sulfuric anhydride impurities, and recovering purified phthalic anhydride.

9. A process for the purification of phthalic anhydride obtained by subjecting impure phthalic anhydride to a purifying treatment with a sulfuric anhydride purifying agent and containing sulfuric anhydride impurities which comprises refluxing said phthalic anhydride in intimate contact with finely divided, calcined wood-charcoal for a period of time at least sufficient to decompose said sulfuric anhydride impurities.

10. A process for the purification of phthalic anhydride obtained by subjecting impure phthalic anhydride to a purifying treatment with a sulfuric anhydride purifying agent and containing sulfuric anhydride impurities which comprises refluxing said phthalic anhydride in intimate contact with about 1 per cent by weight of finely divided, calcined wood-charcoal for a period of time at least sufficient to decompose said sulfuric anhydride impurities, and recovering purified phthalic anhydride.

11. A process for the purification of phthalic anhydride obtained by subjecting impure phthalic anhydride to a purifying treatment with a sulfuric anhydride purifying agent and containing sulfuric anhydride impurities which comprises intimately contacting said phthalic anhydride, in the molten state, with about 1 per cent by weight of finely divided, calcined wood-charcoal for a period of time at least sufficient to decompose said sulfuric anhydride impurities, and recovering purified phthalic anhydride.

12. A process for the purification of phthalic anhydride obtained by subjecting impure phthalic anhydride to a purifying treatment with a sulfuric anhydride purifying agent and containing sulfuric anhydride impurities which comprises intimately contacting said phthalic anhydride, at a temperature above its melting point, with a metal standing below hydrogen in the electromotive series for a period of time at least sufficient to decompose said sulfuric anhydride impurities.

13. A process for the purification of phthalic anhydride obtained by subjecting impure phthalic anhydride to a purifying treatment with a sulfuric anhydride purifying agent and containing sulfuric anhydride impurities which comprises intimately contacting said phthalic anhydride, at a temperature above its melting point, with finely divided copper for a period of time at least sufficient to decompose said sulfuric anhydride impurities.

14. A process for the purification of phthalic anhydride, containing sulfuric anhydride impurities, which comprises refluxing said phthalic anhydride in contact with about 1 per cent by weight of finely divided, calcined wood-charcoal, whereby said sulfuric anhydride impurities are decomposed, continuing said refluxing for about one hour after gaseous decomposition products cease to be evolved, and then recovering the purified phthalic anhydride.

15. A process for the purification of phthalic anhydride containing sulfuric acid as an impurity which comprises refluxing said phthalic anhydride at a temperature within the range of about 250° C. to about 290° C. in contact with about 1 per cent by weight of finely divided calcined wood-charcoal, whereby said sulfuric acid impurity is decomposed, continuing said refluxing for about one hour after gaseous decomposition products cease to be evolved, and then recovering the purified phthalic anhydride by distillation.

16. A process for the purification of phthalic anhydride obtained by subjecting impure phthalic anhydride to a purifying treatment with a sulfuric anhydride purifying agent and containing sulfuric anhydride impurities which comprises reacting said phthalic anhydride at a temperature above its melting point with not more than about 2% by weight of a substance adapted to decompose the sulfuric anhydride impurities with formation of decomposition products easily separable from phthalic anhydride under conditions adapted to cause decomposition of said sulfuric anhydride impurities until the sulfuric anhydride impurities are decomposed, and recovering purified phthalic anhydride.

17. A process for the purification of phthalic anhydride containing sulfuric anhydride impurities which comprises refluxing said phthalic anhydride in contact with not more than about 2% by weight of finely divided carbon until said sulfuric anhydride impurities are decomposed, and recovering purified phthalic anhydride.

HAROLD B. FOSTER.
ELTON B. PUNNETT.